Patented Oct. 3, 1922.

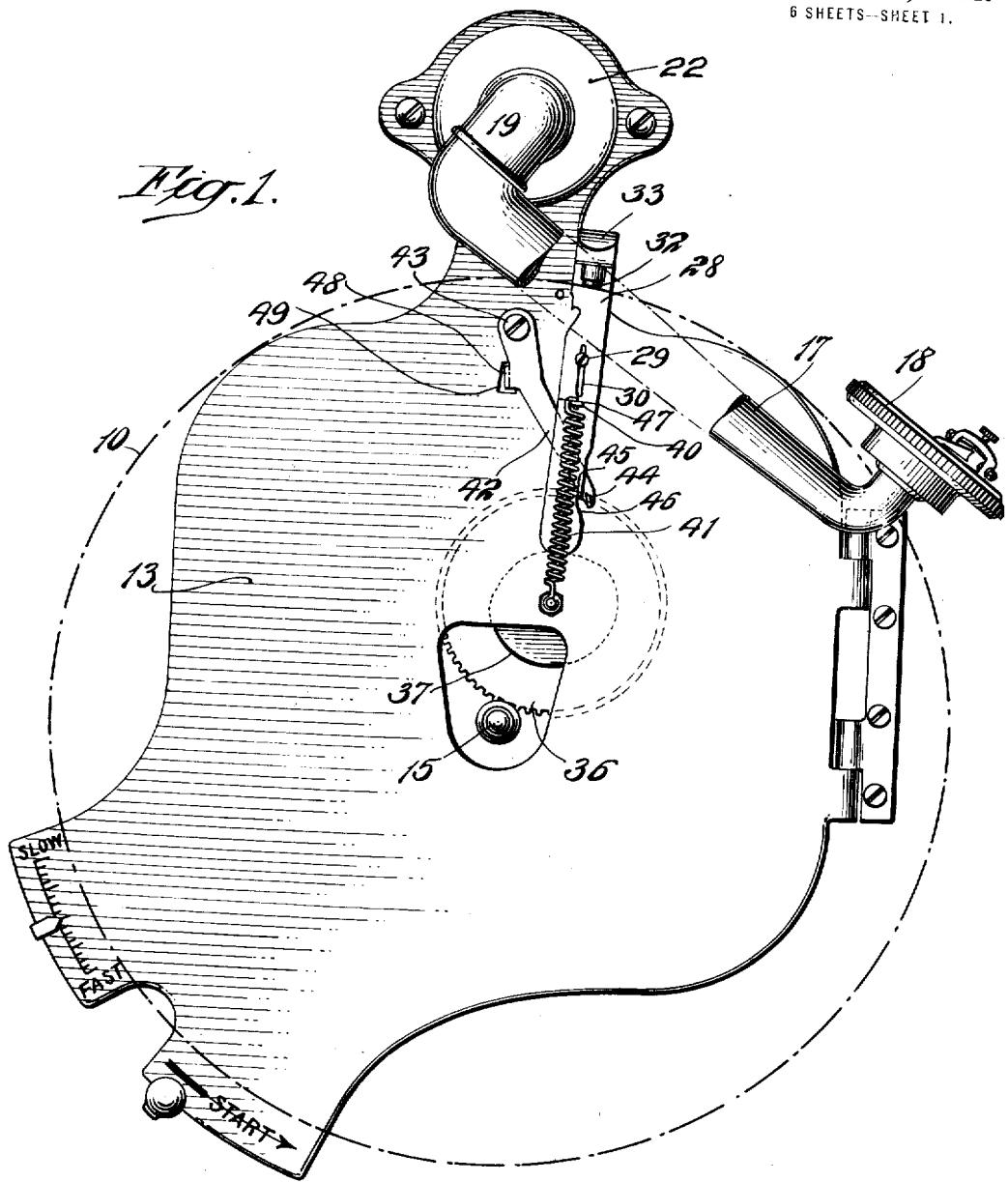

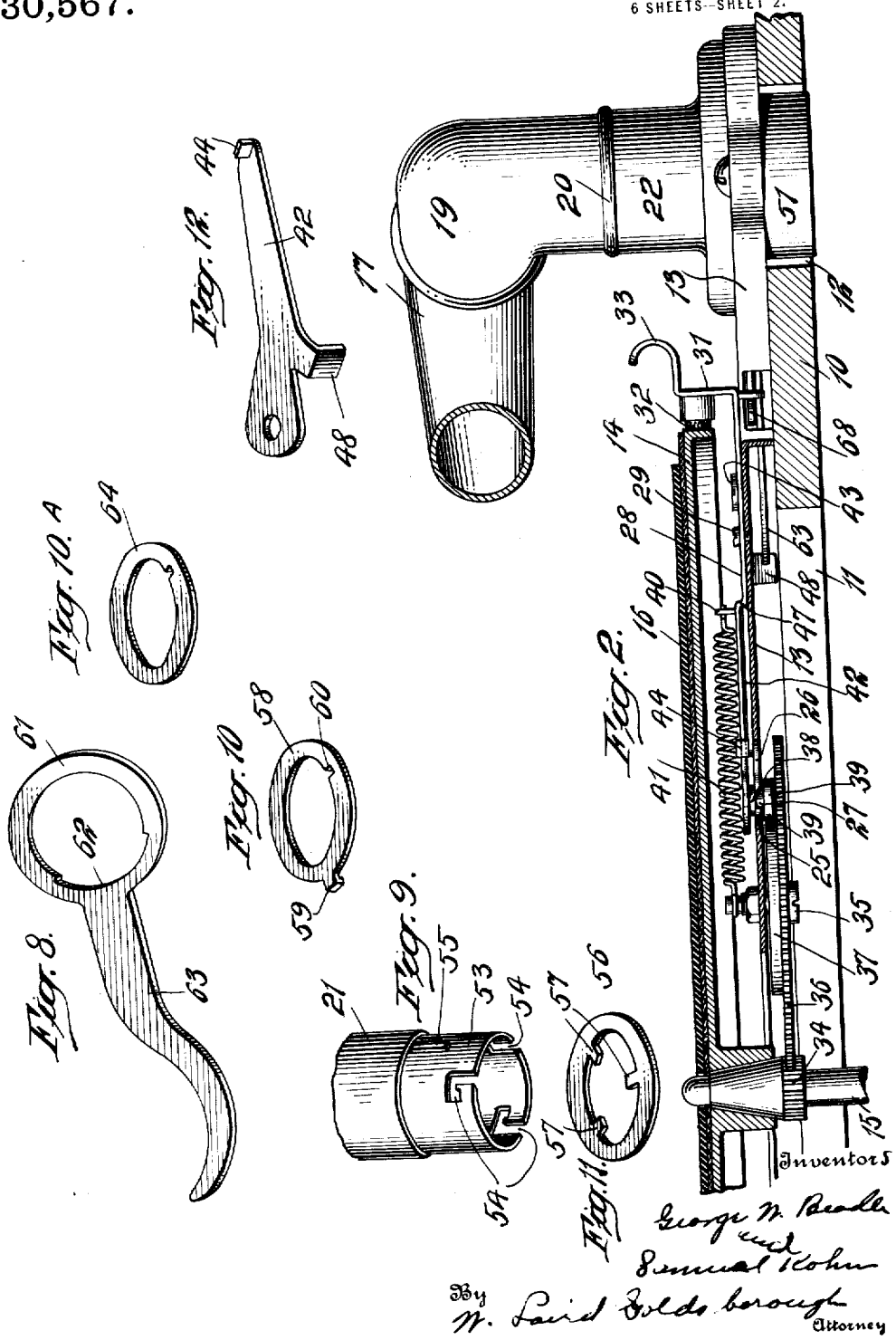

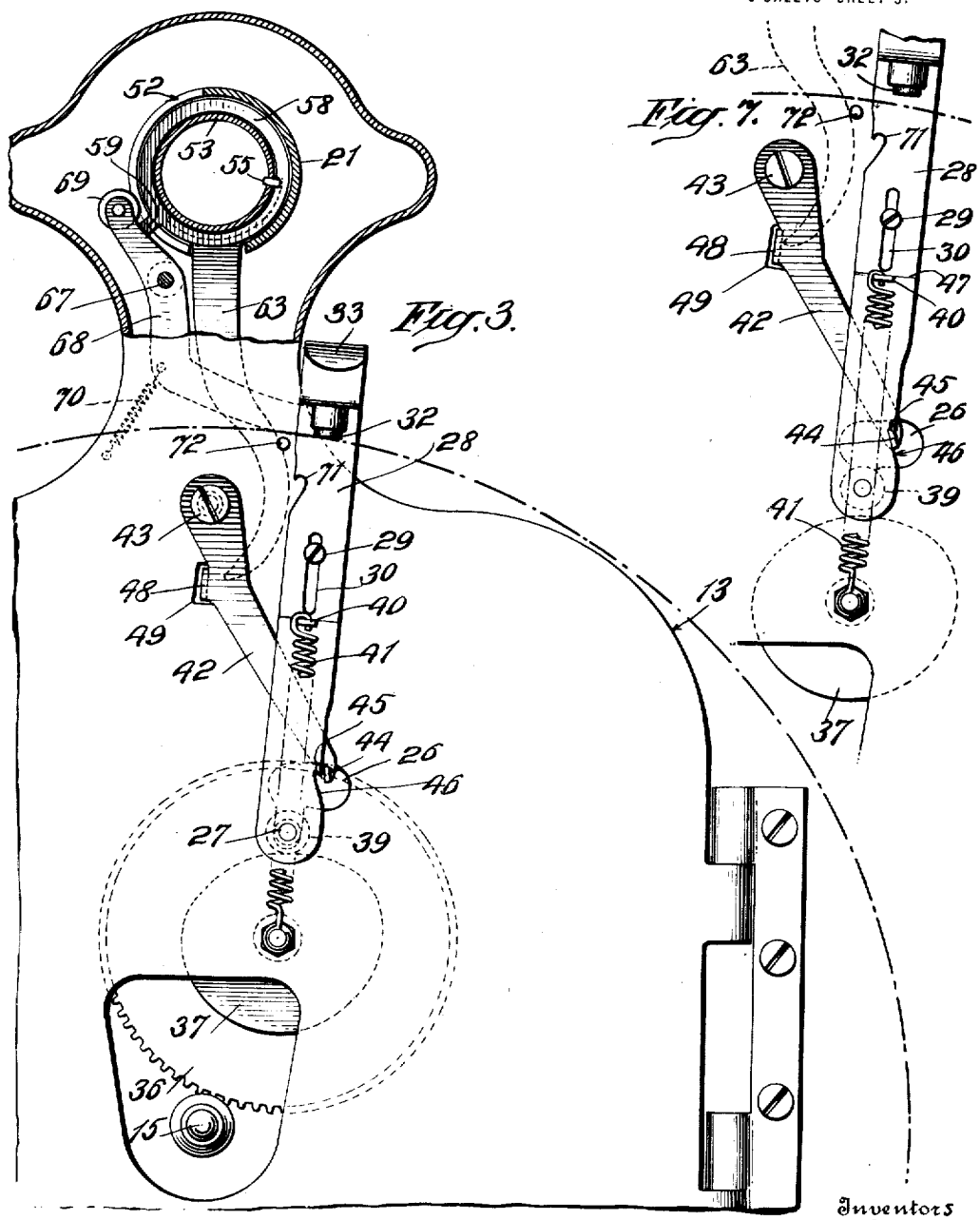

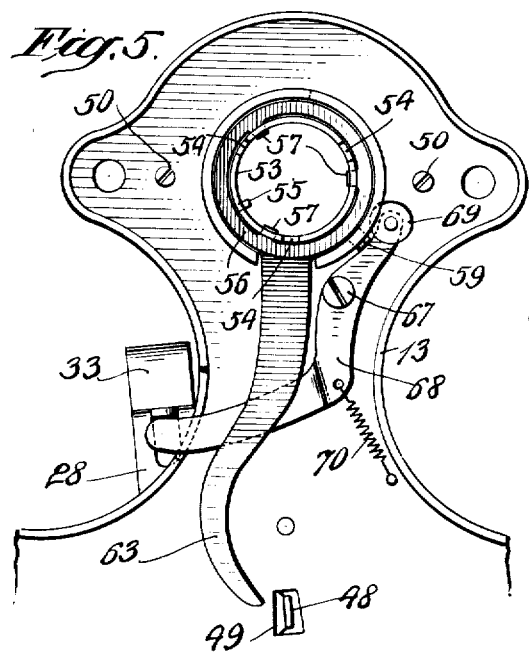
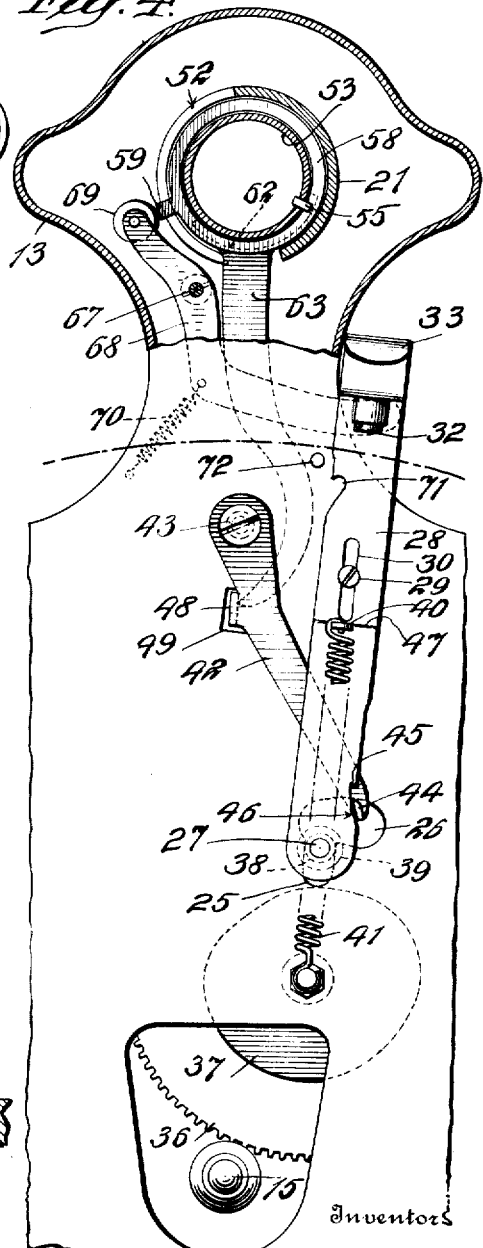
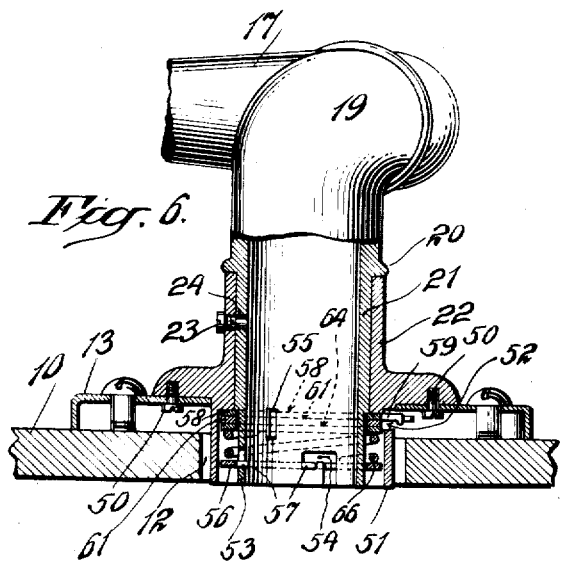

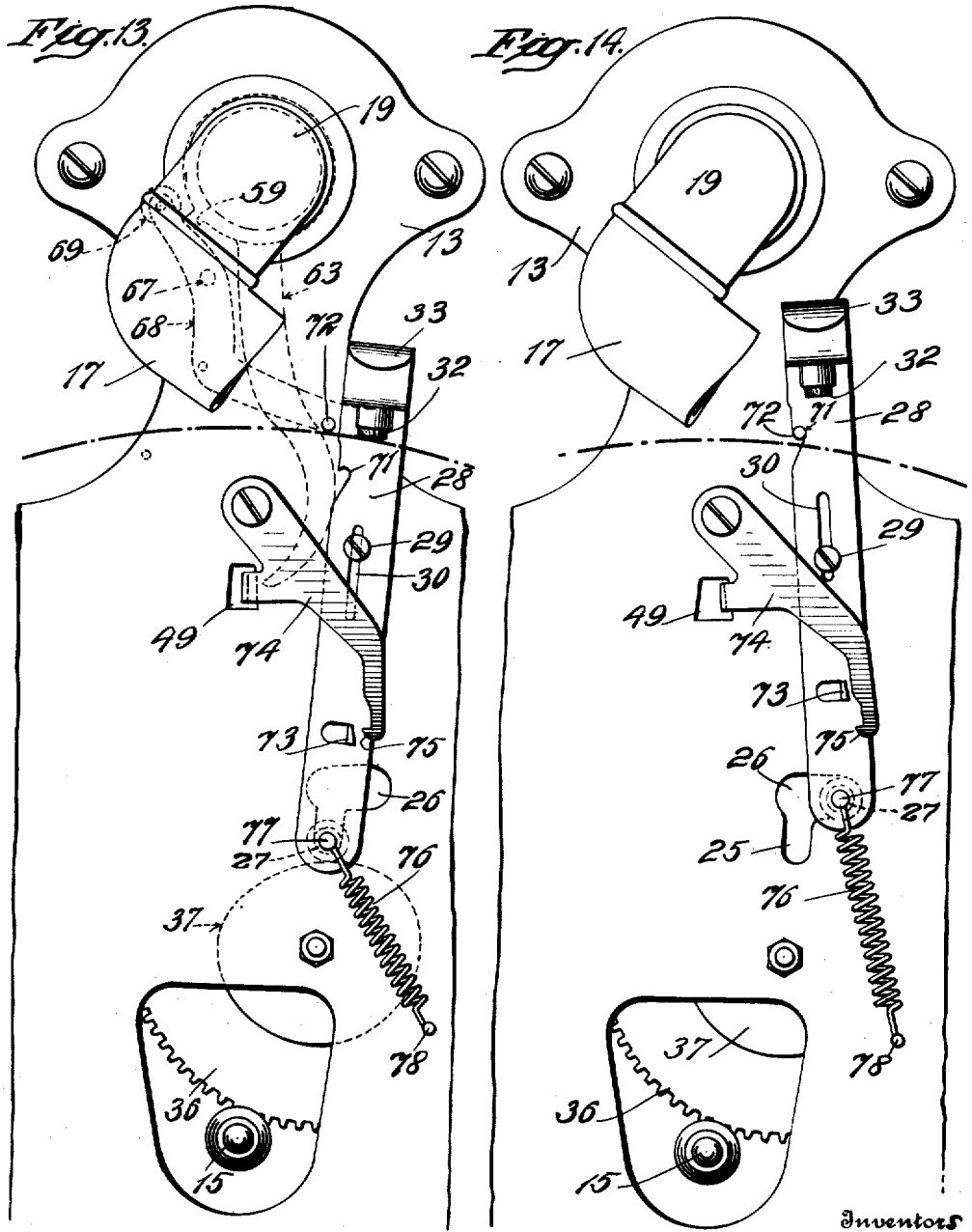

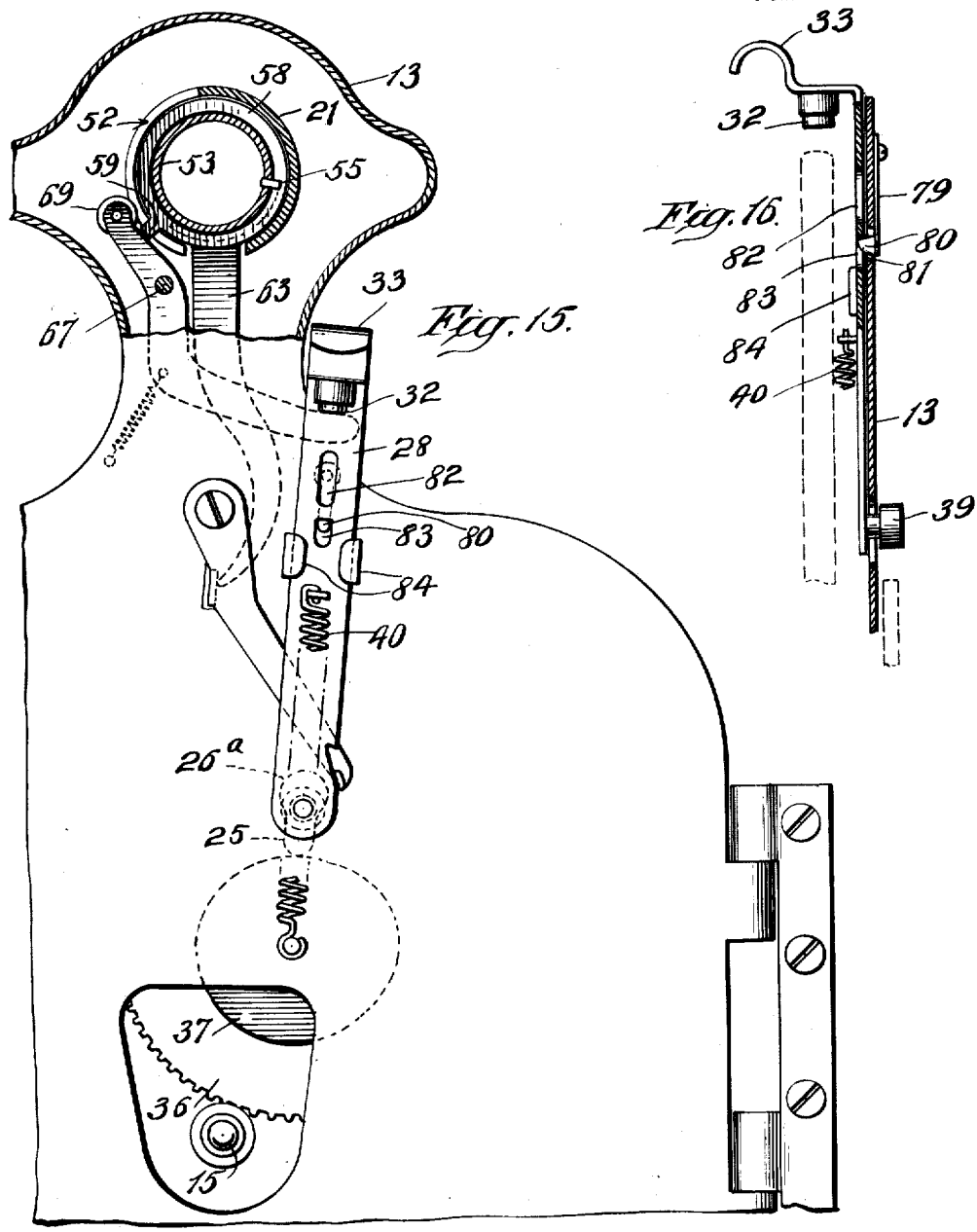

1,430,567

UNITED STATES PATENT OFFICE.

GEORGE W. BEADLE, OF STAMFORD, CONNECTICUT, AND SAMUEL KOHN, OF NEW YORK, N. Y., ASSIGNORS TO COLUMBIA GRAPHOPHONE MANUFACTURING COMPANY, OF BRIDGEPORT, CONNECTICUT, A CORPORATION OF DELAWARE.

AUTOMATIC STOP.

Application filed July 15, 1919. Serial No. 310,912.

*To all whom it may concern:*

Be it known that we, GEORGE W. BEADLE and SAMUEL KOHN, citizens of the United States, and residing, respectively, at Stamford, county of Fairfield, and State of Connecticut, and city, county, and State of New York, have invented certain new and useful Improvements in Automatic Stops, of which the following is a full, clear, and exact description.

The invention which constitutes the subject matter of this application has to do with improvements in automatic stop mechanism especially designed for a talking machine, which ordinarily has a rotating record support or member and a traveling member, as a sound-box and tone-arm, said rotating member and traveling member being relatively movable, the latter being commonly fed relatively to the former by the co-action of the needle of the sound-box with the record groove.

One of the more important features of our invention consists in improved mechanism whereby the actuation and the starting and the stopping of the mechanism from any position is controlled solely by the movement of the reproducer arm or traveling member. The construction is such that the machine will be automatically started when the operator places the reproducer and tone-arm in position to commence reproduction; will be automatically stopped when for any reason, the reproducer member, shall cease its advance movement across the face of the record, and will remain at rest while the tone arm is returned to starting position; will be automatically stopped when the reproducer member is moved toward the position of "rest" beyond the edge of the record; and will be automatically started when the reproducer member is moved from its position of "rest" to the position for commencing the reproduction of the record.

Another important feature of this invention consists in providing mechanism with improved means which will not only enable the starting of the mechanism automatically when the reproducer member is placed above the position to commence the playing of the record, but which will prevent the mechanism controlled by the reproducer member from becoming operatively related to the automatic stop mechanism so long as the reproducer member remains in this position irrespective of the number of revolutions of the rotating member made while in this position. In other words the mechanism controlled by the rotating and traveling member for actuating the stop mechanism is so constructed as to become operatively related to said stop mechanism only after the traveling element has moved inwardly for a predetermined distance across the face of the record.

Stop mechanisms heretofore devised for accomplishing stated objects have been more or less complicated in construction. A still further feature of our invention therefore resides in the fact that we have not only made the device entirely automatic but reduced the number of parts, made it more positive in operation and cheapened its cost of manufacture.

Further objects and advantages will appear from the detailed description below taken in connection with the accompanying drawing in which, Fig. 1 is a top plan view of our invention as adapted for use in talking machines.

Fig. 2 is a vertical section through a part of Fig. 1.

Fig. 3 is a horizontal section through a part of Fig. 2 showing the brake mechanism in operative position.

Fig. 4 is a view similar to Fig. 3 showing the brake mechanism in its released position.

Fig. 5 is a bottom fragmentary plan view of the brake releasing mechanism.

Fig. 6 is a fragmentary vertical section through the base of the tone arm.

Fig. 7 is an enlarged detail fragmentary view of some of the elements appurtenant to the brake member.

Fig. 8 is an enlarged perspective detail view of the follower finger.

Fig. 9 is an enlarged fragmentary perspective detail view of one of the tone arm members.

Fig. 10 is an enlarged perspective detail view of one of the friction discs which also serves as brake releasing member.

Fig. 10^A is an enlarged view of another friction disc.

Fig. 11 is a fragmentary perspective view of an annular spring retaining member.

Fig. 12 is an enlarged perspective view of the latch member.

Fig. 13 is a fragmentary top plan view of a modification of the invention showing the braking mechanism in operative position.

Fig. 14 is a view similar to that shown in Fig. 13 with the braking mechanism in its releasing position.

Fig. 15 shows a slightly modified form of the invention, parts being in plan and parts in section, and Fig. 16 is a vertical section of a detail of Fig. 15.

Referring to the drawings in detail, and in particular to the construction illustrated in Figures 1 to 12 inclusive, the reference numeral 10 (see Fig. 2) designates the top of a conventional form of phonograph cabinet having a centrally located opening 11 to provide convenient access to the motor (not shown), and also an opening 12 to receive the elements which establish communication between the sound reproducing elements and the sound amplifying instrumentalities. The opening 11 is closed by the hinged motor board 13, preferably made of metal and of the usual construction. Located above the motor board 13 is a turn-table 14 supported upon a rotating spindle 15, and positioned upon the turn-table is a conventional form of record disc 16. Positioned above the record disc 16 and motor board 13 is a tone arm 17 provided with a sound-box 18, said tone arm and sound-box constituting a traveling member. The tone arm is swivelled to the laterally extending portion of the elbow member 19 to enable it to be raised and lowered with respect to the sound record. The elbow member is provided with an annular shoulder 20 (see Fig. 6) and a downwardly extending portion 21, the former of which rests upon and the latter of which is swivelled to the base member 22, thus enabling the tone arm to oscillate in a horizontal direction over the sound record. A lock screw 23 in the base member 22 engages with a horizontal slot 24 in the swivelled portion 21 to enable relative rotation, but preventing relative longitudinal movement of the base and elbow members. The foregoing parts are all broadly old and well known and are therefore no part of our invention, except as they constitute a part of the combination defined by the appended claims.

The motor board 13 is provided with a guide slot 25 (see Figs. 4 and 14) which terminates in an enlarged irregular shaped opening 26 and serves to receive and guide a depending pin 27 (see Fig. 2) secured to the reciprocating stop member 28. The motor board is also provided upon its upper surface with a screw 29 which engages within a slot 30 in the stop member 28. The screw 29 and slot 25 of the motor board in conjunction with the slot 30 and depending journal pin 27 serve to determine or rather control the movements of the normally reciprocating stop member 28. In the construction illustrated, the outer end of the stop member is provided with an upstanding flange 31 (see Fig. 2) which carries a friction pad 32, adapted to engage with the edge of the turntable 14 for the purpose of braking the latter. The upper end of the flange 31 preferably terminates in a shepherd's crook 33, which serves as a manual manipulating means, to render the stop member 28 inoperative whenever that is desired, as will be more fully explained hereinafter.

The turn-table supporting spindle 15 is actuated in the usual way by means of a motor (not shown) and is provided with a pinion 34 (see Fig. 2) fixed thereto and conveniently located below the motor board 13. At a point on the motor board adjacent the supporting spindle, is a screw or stud 35 acting as a shaft or journal for carrying a gear 36, which meshes with the pinion 34, and rigidly secured in any convenient manner to the upper face of the gear 36 is an irregular cam surface or eccentric 37.

Fixed to the inner end of the stop member 28, as before stated, is the downwardly depending journal pin 27, passing rather snugly through the slot 25. Preferably integral with the journal and normally located above the slot 25 is a washer 38; and rotatably mounted upon this journal below this slot is a bearing roller 39 adapted to engage the periphery of the cam 37. The washer 38 and bearing roller 39 are spaced from each other a distance substantially equal to the thickness of the motor board 13 and as their respective diameters are greater than the width of the slot 25, it will be readily apparent that the inner end of the stop member 28 will be accurately guided thereby. However, the bearing roller 39 is preferably small enough, as compared to the irregular shaped opening 26, to pass through the latter to facilitate the assembling of the stop member. The stop member is provided with an upstanding tie-post 40 to which one end of the spring 41 is attached, the other end of the latter being attached to the motor board, preferably to the upstanding portion of the journal screw 35 and serves, except as hereinafter provided, to maintain the roller 39 in normal engagement with the periphery of the cam 37.

A latch member 42 is pivoted on a screw 43, arranged in proximity to the reciprocating stop member and is provided at one end with an upstanding web or lug 44, adapted to engage the locking shoulder 45 on each inward reciprocation of the stop member, as the traveling element is feeding across the record, thereby limiting the inward movement of the stop member.

On the stop member adjacent the shoulder 45 is a cam surface 46 which, on each outward reciprocation of said stop member, serves to move the web 45 of the latch member out of the normal path of the shoulder 45. The web 44 may be a separate and distinct member secured to the end of the latch 42, or it may be formed by the upward bending of its extreme end. For the sake of compactness in the arrangement of the elements the shoulder 45 and cam 46 of the stop member are located on the side opposite to the pivotal point of the latch. When this arrangement is employed the body of the latch member preferably passes below the reciprocating brake member and hence the reciprocating brake is preferably stepped or offset at 47, so as to enable the end of the reciprocating brake to pass freely thereunder. The latch member 42 is further provided with a downwardly depending curtain or pusher surface 48 passing through a perforation 49 in the motor board. The objects and the correlation of the various parts specifically described in this paragraph will be more fully explained hereinafter.

The tone arm base or support 22 is mounted on the motor board 13 by suitable, preferably concealed, screws 50 (see Fig. 6) and is provided with a skirt 51 having a circumferential slot 52 in the side facing the record to permit the elements controlling the stop mechanism to project therefrom. One of the edges of this opening serves to maintain the end of a follower finger, to be described, within a limited distance of the pusher surface 48. The member 21 which preferably rotates about a vertical axis, as previously described, is provided with a downwardly extending sleeve 53, which is provided (see Figs. 6 and 9) with a plurality of circumferentially disposed bayonet slots 54 and a vertically disposed key 55. An annular spring retaining member 56 having a plurality of inwardly projecting radial lugs 57 is adapted to lock with the sleeve 53, the lugs 57 thereof engaging and locking with the bayonet slots when in operative position as will be readily understood. A plurality of superposed friction discs surround the sleeve 53 and serve to operate the stop releasing mechanism through the rotation of the traveling element. The upper one of these discs (see Fig. 10) designated by 58 has formed on its periphery a lug 59 adapted, when the tone arm is brought to its initial position, to release the reciprocating stop member and permit the turntable to rotate, and is also provided with a notch or keyway 60 engaged by the key 55 so that it rotates as a unit with the skirt 53. The inner periphery of the intermediate friction disc 61 is cleared away at 62 so as to permit the follower finger 63 to remain unaffected by the movement of the key 55; that is to say, it enables said key to move back and forth therein. A third disc 64 is located below the intermediate disc 61 and is provided with a key-way for the key 55 so that it also rotates as a unit with the skirt 53. The three friction discs are maintained in intimate contact with each other by a spring 66 (see Fig. 6) having its lower end engaging the annular spring retaining ring 56 and with its upper end bearing against the lower surface of the friction disc 64. The intermediate friction disc 61 has secured thereto preferably integral therewith the follower finger 63, the curved end of which is adapted to engage the depending pusher surface 48 of the latch member 42. This disc 61 and finger 63 we shall hereinafter refer to as the "follower member". The specific mechanism just described for effecting a frictional engagement with the follower member is merely the preferred form and it is therefore expressly understood that we do not confine ourselves thereto.

The follower member, due to its frictional engagement with discs 58 and 64, as the traveling member feeds across the record, tends to rotate the latch member 42 in a clockwise direction causing the web 44 to bear against the edge of the reciprocating stop member. As the stop member is moved outwardly by the cam 37 against the action of the spring 41, as it does once for each complete rotation of said cam 37, the cam surface 46 oscillates the latch member in a counter clockwise direction to a point where the web 44 is out of the path of the shoulder 45 as previously explained. This movement of the latch member is turn imparts a corresponding counter-clockwise movement to the follower member. As the bearing roller 39 on the stop member 28 moves from the high towards the low point of the cam 37, thus enabling the inward reciprocation of the brake member, the follower member 61—63 will be moved by the inwardly traveling tone arm in a clockwise direction imparting at the same time, a corresponding clockwise movement to the latch member 42, these movements being so correlated that before the stop member arrives at a predetermined point the web or lug 44 will be located in the path of the shoulder 45 thereby limiting the inward reciprocating movement of the brake member. In point of fact the specific construction herein illustrated is such that the movement of the latch member 42 by the follower member will effect a constant engagement of the lug 44 from the high to the low point of the cam surface 46 as the stop member is moved inwardly under the tension of the spring 41. When the traveling element ceases to feed across the record, which will take place when the needle of the tone arm reaches the last groove in the record disc, obviously the follower member no longer forces the lug 44 inwardly into the path of the shoulder 45 thus enabling the roller 39 to ride down the receding incline on the cam 37 until the stop member, under the force of the spring 48, has moved inwardly a sufficient distance to cause the friction member 32 on said stop member to engage with and stop the rotation of the turn-table.

Pivoted between its ends at 67 to the motor board 13 is a lever 68 provided on one end with a cam roller 69 adapted to be actuated by the camming member 59. The other end of the lever 68 is provided with an operating nose adapted to engage the inner surface of the upstanding flange 31 of the stop member. The actuation by the camming member 59 of the cam roller 69, as the tone arm is moved from its position of "rest" indicated in Fig. 1 to the position where the instrument starts to play the record, oscillates the lever 68 about its pivot 67 in a counter-clock disc direction, thereby moving the stop member outwardly to release the turn-table. A spring 70 normally maintains the inner end of the lever 68 in such position as not to interfere with the brake pad 32 of the reciprocating stop engaging the edge of the turn-table. A notch 71 is provided on one edge of the reciprocating brake member and an upstanding pin 72 is secured to the motor board 13. When it is desired to operate the talking machine without the automatic stop mechanism, the reciprocating stop member is moved to a position so that the notch 71 engages the pin 72. In this position of the stop member the roller 39 is disengaged from the cam 37 and hence the stop member remains stationary during the rotation of the turn-table. When it is desired to operate the machine with the automatic stop mechanism functioning, the stop member is released by disengaging the notch 71 from the pin 72. The spring 41 then retracts the stop member so that the roller 39 engages the cam 37. It may be stated in this connection that as long as the stop member is being actuated by the engagement of cam 37 with roller 39, it has a reciprocating motion, due to the fact that its outward movement by the cam 37 is never sufficient to disengage the journal pin 27 from the slot 25. However, when the stop member is moved slightly beyond its extreme outward movement caused by cam 37, the journal pin 27 will be positioned within the confines of the irregular slot 26, thereby enabling the stop member to partake of a rotary motion about the screw 29 as an axis and permitting the notch 71 to engage the pin 72, as clearly illustrated in the modified form shown in Fig. 14. This is merely the preferred form of construction for rendering the non-set stop device disorganized or inoperative, and it is therefore to be understood that we do not limit ourselves specifically thereto.

In the modification shown in Figs. 13 and 14, the stop member, instead of being provided with a shoulder and cam, or in effect a notch, as shown in the other modification, has an upturned leaf or lug 73 adapted to be engaged by a latch 74 having a bill-hook end 75. Instead of this latch passing under the reciprocating brake member, it rests directly on the upper surface thereof. Hence the stop member need not be stepped as shown in Figs. 1 to 12. The spring 76 has one of its ends secured to a pin 77, which is preferably an extension of the journal pin 27, extending upwardly from the stop member and its other end is secured to a tie-post 78 fixed in the motor board 13. The post is preferably offset from the direct line of the stop member not only to eliminate any possible obstruction to the free reciprocation thereof, but to facilitate the manipulation of the stop mechanism in rendering it temporarily inoperative. With respect to the other details no material difference in structure from the modification shown in Figs. 1 to 12 will be found.

The operation of the modification shown in Figs. 1 to 12 inclusive is as follows:—Let it be assumed that the traveling member is carried beyond the edge of the turn-table to the position of rest, as is the case when a record is to be changed or replayed, as illustrated in Figs. 1 and 3. In this position of the sound reproducer and its appurtenant elements, the cam 59 (see Fig. 3) is located in a counter-clockwise position with respect to the bearing roller 69 on the end of the bell crank 68. The follower finger 63 of the follower member 61—63 in the supposed position bears against the right-hand edge of the circumferential slot 52 having been brought to this position by virtue of the frictional engagement of its disc 61 with discs 58 and 64, in the movement of the sound reproducer outwardly over the face of the record. The relative position of the other elements will be apparent from a casual inspection of Figs. 1 and 3. As the tone arm or traveling element is being brought to the position where the reproducer needle engages the record groove at the beginning of the record, the lug 59 engages the roller 69, oscillates the lever 68 against the tension of the spring 70, and causes the stop member 28 to move outwardly against the tension of spring 41. This releases the brake pad 32 from the edge of the turn-table and permits the latter to rotate. At this moment the position of these parts is clearly illustrated in Fig. 4. The movement of the tone-arm from its position of rest to the position where the needle engages the adjacent record groove causes the outer end of the follower member to engage with the web 48 of the latch member 42, the latter being substantially at its extreme point of movement in a counter-clockwise direction, it being of course understood that its movement in this direction is preferably limited by the engagement of the web 48 with the wall of the perforation through which it passes. As the traveling element feeds across the record, the cam 59 passes the roller 69 on the end of the bell crank and permits the latter to take its normal position under the influence of the spring 70. It will be seen however that before the cam 59 passes the roller 69 the operation of the follower member and latch member, though idle, is taking place, that said members only begin to function after the said cam 59 passes slightly beyond the dead center of said roller 69. Consequently there is no possibility at this time of the stop member functioning as such since its first inward movement is arrested or "limited" by the automatic positioning of the lug or web 44 behind the shoulder 45 in the manner previously explained. This does not necessarily mean however that the "first" inward movement of the stop member is arrested by the latch member 42, as it will be readily apparent, depending upon the correlative position of the cam lug 59 and cam wheel 37, that the roller 39 will contact with the said cam wheel 37 in advance of the engagement of the shoulder 45 with the web 44. The point is that during the first few rotations of the record disc the stop member is held out of its operative position by the lever 68 and its co-operating cam lug 59, and that at any predetermined point thereafter this particular work of the lever 68 may be effected by the follower member 61—63 and the latch member 42. The rotation of the spindle 15 and its pinion 14, during the reproduction of the record, causes a rotation of the gear 36 and its attached cam or eccentric. The rotation of the eccentric by engagement of its periphery with the roller 39 on the end of the brake member 28 causes the latter to reciprocate. The outward reciprocations of the brake member, as before mentioned, force the web 44 of the latch member out of operative engagement with the stop member 28. While the tone arm and its reproducer are feeding across the record, the follower finger 63 by frictional engagement of its disc 61 with the other contiguous discs engages with the curtain or pusher surface 48 and tends to rotate the latch 42 in a clockwise direction. This clockwise impulse imparted to the latch member causes the lug or web 44 to engage the shoulder 45 on each inward reciprocation of the brake member, thereby preventing the brake pad secured to the brake member from engaging the turn table. When, however, the tone arm reaches the end of the record, the clockwise impulses of the follower member and of the latch member are discontinued, and the web or lug 44, which has been moved out of the path of the shoulder 45 in the manner previously explained, is not thereafter forced into engagement with the notch on its inward reciprocation, thus permitting the stop or brake member 28 to move inwardly under the influence of the spring 41 whereby the brake pad 32 engages the turn-table and stops its rotation. When it is desired to either reproduce the same record or to reproduce another record, the traveling member is again swung to its initial position beyond the edge of the turn-table, as illustrated in Fig. 1, the follower finger being prevented during this movement from following the traveling member beyond a predetermined point, by its engagement with the edge of the circumferential slot 52 at the lower end of the tone-arm. When the reproducer needle is placed on the record the cam 59 again rocks the lever 68 to release the turn-table, permitting a repetition of the operation above described.

Figures 15 and 16 illustrate a slightly modified construction enabling the stop member to partake only of a longitudinal movement in moving the same from operative to neutral position. To that end the motor support is provided with an impositive lock 79 the nose 80 of which projects upwardly through a perforation 81 in the motor board and normally reciprocates in the slot 82 but adapted to engage the slot 83 when moved to neutral position. Guide slot 25 in this modification terminates in an enlargement 26ª in line with said slot 25. The object of providing the enlargement is to enable the attachment to the stop member 28 of the cam 39 before assembling these parts on the motor board. To control the movements of the stop member there is provided therefor a guide 84 mounted on the motor board.

The stop member 28 is illustrated in the accompanying drawings as a brake but it is to be expressly understood that our invention is not limited thereto as the stop element in question may be a contact or the like employed to operate a contact to start and stop the motor. And it may also be stated in this connection that while the embodiments of the invention illustrated in the drawings have been described with considerable particularly, it is to be further understood that we do not limit ourselves thereto, as many changes may be made in point of detail and other embodiments resorted to without deviating from the true spirit and scope of our invention as defined by the appended claims.

What we claim is:—

1. In combination, a traveling member, a rotating member, means for actuating said rotating member, a stop element periodically reciprocated by said means, and means co-operating with said stop element for limiting its reciprocations in one direction, and acting when the traveling member stops in its progress to render operative said stop element.

2. In combination, a traveling member, a rotating member, means for actuating said rotating member, and means acting when the traveling member ceases to move to stop said rotating member comprising a reciprocating stop member, means actuated by the movement of the traveling member to limit the reciprocation of said stop member in one direction, said last-mentioned means being rendered inoperative by the reciprocation of the stop member in the other direction when the traveling member ceases to progress.

3. In combination, a traveling member, a rotating member, and means acting when the traveling member ceases to move to stop the rotation of said rotating member comprising a stop member, means for imparting substantially longitudinal impulses to said stop member, and means rendered operative by the movement of the traveling member for limiting the impulses in one direction but rendered inoperative when the progress of the traveling member ceases to enable the stop member to become effective.

4. In combination a traveling member, a rotating member, and means acting when the traveling member ceases its progress to stop the rotation of said rotating member comprising a stop member, means for imparting substantially longitudinal impulses to said stop member, and means rendered operative by the movement of the traveling element for limiting the impulses in one direction but rendered inoperative by the stop member when the movement of the traveling member ceases to enable the stop member to stop the rotation of said rotating member.

5. In combination, a traveling member, a rotating member, and means acting when the traveling member ceases its progress to stop the rotation of said rotating member comprising a stop member, means for imparting impulses to said stop member, means rendered operative by the movement of the traveling member for limiting the impulses in one direction, and means associated with said stop member adapted to render the said means inoperative whenever the movement of the traveling member ceases thereby enabling the stop member to continue its otherwise limited movement to effective position.

6. In a stop mechanism, the combination with two independently moving members, of a stop element, means for imparting impulses to said stop element, means rendered operative by the movement of one of said members for limiting the impulses of said stop element in one direction, but rendered inoperative by the stop element when the progress of said member ceases to enable the continuation of its movement to effective position to stop the other member.

7. In a stop mechanism, the combination with two independently moving members, of a stop element, means for imparting impulses in opposite directions to said stop element, means rendered operative by the movement of one of said members for limiting the impulses of said stop element in one direction, and means associated with the stop member for rendering said means inoperative when the progress of said last mentioned moving member ceases, thereby enabling the stop member to continue its movement to effective position to stop the movement of the other moving member.

8. In a stop for talking machines the combination of a traveling element, a rotating element, a brake member, a follower finger frictionally driven by the traveling element, a latch positively actuated by said finger to engage said brake member, resilient means normally tending to hold the brake member in engagement with the rotating element, means cooperating with the rotating element to reciprocate said brake member, the follower finger causing the latch to lock with the brake member on each reciprocation while the traveling element travels, and means preventing the locking of the latch therewith when the traveling element has ceased its progress thus permitting the brake to operate.

9. In a stop for talking machines, the combination of a traveling element, a rotating element, a brake member, a follower finger in frictional engagement with the traveling element, a pivoted latch, a brake member having a notch, means cooperating with the rotating element to reciprocate said brake member, means to maintain said latch in locking engagement with the brake member while the traveling element is feeding across the record, and means to release said brake member when the traveling element has ceased its progress, thereby permitting the brake to operate.

10. In a stop for talking machines, the combination of a traveling element a rotating element, a brake member, means cooperating with said rotating element to reciprocate said brake member, means cooperating with said traveling element and said brake member to maintain said brake in its released position while the traveling element is traveling, a cam secured to said traveling element, and a lever adapted to be engaged by said cam when the traveling element is moved to the beginning of the record and when so engaged to release said brake member.

11. In a stop for talking machines, the combination of a traveling element, a rotating element, a brake member, means cooperating with said rotating element to reciprocate said brake member and means cooperating with said traveling element and said brake member to maintain said brake member in its released position while the traveling element is traveling, and means comprising a pivoted member actuated by the traveling member to release said brake member following a brake application.

12. In a brake mechanism, the combination of a rotating member and a traveling member, a brake element for the rotating member, means for imparting impulses in opposite directions to said brake element whereby it is adapted to be engaged with and disengaged from said rotating member, and means controlled by the movement of said traveling member and brake element to limit said impulses towards engaging position, said controlling means being rendered ineffective to limit the movement of the brake element when the progress of said traveling member ceases.

13. In a stop mechanism, the combination of a rotating member and a traveling member, a stop element for the rotating member, means for imparting impulses in opposite directions to said stop element whereby it is adapted to start and stop said rotating member, and means controlled by the movement of said traveling member and stop element to limit said impulses towards stopping position said controlling means being rendered ineffective to limit the movement of the stop element when the progress of said traveling member ceases.

14. In a brake mechanism, the combination of a rotating member and a traveling member, a brake element for the rotating member, means for imparting impulses in opposite directions to said brake element whereby it is adapted to be moved towards and from its engaging position with said rotating member, and means controlled by the movements of the traveling member and brake element for enabling the brake element to engage said rotating member when the progress of the traveling member ceases.

15. In a brake mechanism for talking machines, the combination with two independently moving members of a brake means rendered operative by the stopping of one of said moving members to stop the other moving member, and independently mounted means operated by the movement of one of said moving members to its initial position for rendering said brake means temporarily ineffective.

16. In a brake mechanism for talking machines, the combination with a rotating record member and a traveling member, of a brake means rendered operative by the stopping of the progress of the traveling member for stopping the rotating member, and independently mounted means operated by the movement of the traveling member to its initial position adjacent the periphery of the record member for releasing said brake from said rotating record member.

17. In a stop for talking machines, the combination of a traveling element, a rotating element, a brake member, means cooperating with said rotating element to reciprocate said brake member, and means cooperating with said traveling element and said brake member to maintain said brake in its released position while the traveling element is traveling.

18. In a stop for talking machines, the combination of a traveling element, a rotating element, a brake member, means comprising a cam cooperating with said rotating element to reciprocate said brake member, and means cooperating with said traveling element and brake member to maintain said brake in its released position while the traveling element is traveling.

19. In a stop for talking machines, the combination of a traveling element, a rotating element, a brake member adapted to engage the rotating element, means actuated by said rotating element to reciprocate said brake member, and means cooperating with said traveling element and brake member to maintain the brake in its released position while the traveling element is traveling.

20. In a stop for talking machines, the combination of a traveling element, a brake member, a lug movable with said traveling element, a pivoted member adapted to be engaged by said lug when the traveling element is moved to the beginning of the record, and when so engaged to release said brake member.

21. In a stop for talking machines, the combination of a traveling element, a rotating element, a brake member, means cooperating with said rotating element to reciprocate said brake member and means cooperating with said traveling element and brake member to maintain said brake in its released position while the traveling element is traveling, a lug movable with the traveling element, a lever having one end in the path of said lug and the other in the path of said brake member, said lug being so positioned that the lever is actuated to release the brake in a predetermined position.

22. In combination with a motor and a traveling member propelled thereby, of a stop device, means actuated by said motor for moving said stop device from and towards operative position, means actuated by the movement of said traveling member for limiting the movements of said stop device towards operative position, said limiting means being rendered ineffective by the movement of the stop device from operative position and by the stopping of the progress of the movement of the traveling member, whereby said stop device is rendered operative.

23. In a brake mechanism, the combination with a rotating member and a traveling member, of a reciprocating brake element for the rotating member, and means actuated by the rotating and traveling members for controlling said brake element comprising mechanism for reciprocating said brake element, a latch actuated by the traveling member to limit the reciprocation of said brake member towards its operative position, said latch being rendered inoperative by the reciprocation of the brake element in the opposite direction to enable the brake element on its next reciprocation towards operative position to engage said rotating member.

24. In a brake mechanism, the combination with a rotating member and a traveling member, of a brake element movable in opposite directions and adapted to engage said rotating member to stop its rotation, mechanism for moving said brake element, and means actuated by said traveling member for limiting the movement of said brake element towards operative position, said means being actuated by the brake element in its movement from operative position to render said brake element operative when the progress of the traveling member ceases.

25. In combination with a rotating member and a traveling member, a motor for actuating said rotating member, and means acting when the traveling member ceases to move to stop the rotation of said rotating member, comprising a stop member, means, including a cam actuated by said motor for moving said stop member toward and from operative position, and a latch means rendered operative by the movement of the traveling member for limiting the movement of said stop member towards its operative position but rendered inoperative by said stop member when the progress of the traveling member ceases to enable the stop member to become effective.

26. In combination, a rotating member, a traveling member, a stop element, means operatively connected to the rotating members for moving said stop element intermittently in opposite directions, mechanism operatively connected to the traveling member for limiting the movements of said stop element in the direction of its stop-actuating position, said mechanism being rendered inoperative by the movement of the stop element in the opposite direction and the stopping of the progress of the traveling member.

27. In combination, a rotating member, a traveling member, a stop element, means operatively connected to the rotating member for moving said stop element intermittently in opposite directions, mechanism actuated by the movement of the traveling member for limiting the movements in said stop element in the direction of its stop-actuating position, said mechanism being moved to inoperative position by the movements of said stop element in the opposite direction to enable the stop element to move supplementally to stop-actuating position when the progress of the traveling member ceases.

28. In combination, a rotating member, a traveling member, a stop element, means for moving said stop element intermittently towards and from its stop-actuating position, mechanism actuated by the movement of the traveling member for limiting said movement of the stop element towards stop-actuating position, said mechanism being moved to inoperative position by each movement of said stop element from its stop-actuating position to enable the stop-element to move supplementally to stop-actuating position when the progress of the traveling member ceases.

29. In combination, a rotating member, a traveling member, a stop element, means for moving said stop-element intermittently towards and from its stop-actuating position, mechanism co-operating with and controlled by the movements of the traveling member and the stop element for limiting the movements of said stop element towards stop-actuating position, means for rendering said mechanism inoperative by the movement of the stop-element from its stop-actuating position to enable the stop element to move to stop actuating position when the progress of the traveling member ceases.

30. In combination, a rotating member, a traveling member, a motor for said rotating member, a stop element, means comprising a cam operated by said motor for moving said stop element intermittently from and towards its stop-actuating position, said cam being provided with a high and a low point to enable said stop element to be moved from and to its stop-actuating position, mechanism actuated by the movement of said traveling member for limiting the movements of said stop elements towards stop-actuating position, said mechanism being rendered inoperative by the movements of the stop element from its stop-actuating position to enable the stop element to move to stop-actuating position when the progress of the traveling member ceases.

31. The combination, a rotating member, a traveling member, a stop element, means for moving said stop element intermittently towards and from its stop-actuating position, a latch member for limiting the movements of said stop element towards stop-actuating position, a frictional member actuated by the movement of the traveling member for rendering said latch member operative, said latch member being rendered inoperative by the movement of said stop-element from its stop-actuating position to enable the stop element to move supplementally to stop-actuating position when the progress of the traveling member ceases.

32. In combination, a rotating member, a traveling member, a stop element, and means co-operating with said stop element and acting when the traveling member stops to render operative said stop element comprising means for imparting impulses to said stop element towards and from its stop-actuating position, and controlling means successively moved to operative position to limit said impulses towards stop-actuating position and to inoperative position to enable the stop element to move supplementally when the progress of the traveling member ceases.

33. In a stop mechanism, a rotating record carrying member, a traveling member, a movable stop element, means co-operating with said stop element and acting when the traveling member stops its progress to render operative said stop element, means automatically operated by the movement of the traveling member to its initial position for rendering said stop means ineffective until the traveling member has moved for a predetermined distance over the face of the record, in combination with independently mounted means actuated by the movements of the traveling member and stop element for thereafter controlling the action of said stop element.

34. In a stop mechanism, a rotating member, a traveling member, a movable stop element, means co-operating with said stop element and acting when the progress of the traveling member ceases to render operative said stop element, in combination with mechanism enabling said stop mechanism to be manually disorganized at will.

35. In a stop mechanism, a rotating member, a traveling member, a movable stop element, means cooperating with said stop element and acting when the progress of the traveling member ceases to render operative said stop element, in combination with means cooperating with said stop element to enable said stop mechanism to be manually disorganized at will.

36. A stop mechanism comprising, in combination, a traveling member, a rotating member, means for actuating said rotating member, a stop element for said rotating member movable in opposite direction by said means, and means cooperating with said traveling member and with said stop element for limiting the movements of the latch in its direction towards operative position and action when the traveling member stops its progress to render operative said stop element.

37. In an automatic stop for talking machines, the combination of a traveling member, a stop element, a camming member actuated by said member, a pivoted element having a cam face adapted to be engaged by said camming member when the traveling element is moved to the beginning of the record to render the stop element inoperative.

38. In combination, a traveling element, a rotating element, a stop device adapted to be positively moved by one of said elements and to be limited in its movement toward stopping position by the other element during its progress, the cessation of the normal progress of said other element permitting the stop device to be rendered operative.

39. In combination, a traveling element, a rotating element, a stop device adapted to have to and fro movement and to be positively actuated in one direction by one of said elements, and to be limited in its movement in the other direction through the normal progress of the other element, and adapted when not so limited to move to stopping position.

40. In combination, a traveling element, a rotating element, a stop device for the rotating element adapted to be actuated upon cessation of the normal progress of the traveling element, and means whereby the stop device is rendered inoperative while the traveling element remains within a predetermined area.

41. In combination, a traveling element, a rotating element, means for stopping and releasing the rotating element, said means adapted to be actuated to stopping position upon the cessation of the normal progress of the traveling element, and adapted to be moved to releasing position upon the movement of the traveling element to initial position, and being rendered inoperative to move to stopping position while the traveling element is in said initial position.

42. In combination, a traveling element, a rotating element, means for stopping and releasing the rotating element, said means adapted to be actuated to stopping position upon the cessation of the normal progress of the traveling element, and adapted to be moved to releasing position upon the movement of the traveling element to initial position, and being rendered inoperative to move to stopping position while the traveling element is in said initial position and within a predetermined area immediately adjacent said initial position.

43. In combination, a traveling element, a rotating element, means for stopping and releasing the rotating element, said means adapted to be actuated to stopping position upon the cessation of the normal progress of the traveling element, and means moved by the traveling element adapted to actuate said first means to releasing position upon the movement of the traveling element to initial position, said means adapted to positively maintain said first means in releasing position while the traveling element moves through a predetermined initial period.

44. In combination, a traveling element, a rotating element, means for stopping and releasing the rotating element, said means adapted to be actuated to stopping position upon the cessation of the normal progress of the traveling element, and means moved by the traveling element adapted to actuate said first means to releasing position upon the movement of the traveling element to initial position, said means adapted to positively maintain said first means in releasing position while the traveling element moves within a predetermined area adjacent the initial position.

45. In combination, a traveling element, a moving element, means to vary the velocity of the moving element, said means adapted to be moved by one element and adapted to have return movement, the other element adapted to limit said means in its return movement during the normal progress of said other element, and which means is caused to act when such progress changes.

46. In a brake mechanism for talking machines, the combination with two independently moving members of a brake means rendered operative by the stopping of one of said moving members to stop the other moving member, and independently mounted means operated by the movement of one of said moving members from its non-playing position to its initial playing position for rendering the brake means temporarily ineffective, said independently mounted means being provided with means to enable the free return of the traveling member past the initial playing position to normal position.

47. In a brake mechanism for talking machines, the combination with a rotating member and a traveling member, of a brake means rendered operative by the stopping of the traveling member for stopping the rotating member, and independently mounted means operated by the movement of the traveling member to its initial position adjacent the periphery of the record member, the brake means remaining unaffected by the return of the traveling member to normal position outside the periphery of the rotating member.

48. In a stop mechanism for talking machines, the combination with a rotating member and a traveling member, of a stop means rendered effective by the stopping of the traveling member for stopping the rotating member, and means actuated by the movement of the traveling member to its initial position in starting the record for moving the stop means to ineffective position, said means being provided with devices to enable the free return of the traveling member to normal position outside the periphery of the rotating member.

49. In a stop mechanism for talking machines, a rotating member, a reproducing member adapted to be moved beyond the periphery of the record in combination with an automatic stop means controlled and rendered effective by the stopping of the reproducer member, and means actuated by the movement of the reproducer member from its position beyond the periphery of the record to the position where it commences to play the record for releasing the stop member, said means maintaining the stop mechanism in released condition out of control of the reproducer member until the latter has moved inwardly for a predetermined distance over the face of the record and provided with devices to enable the free return of the reproducer member to normal position.

50. The construction with a rotating member and a traveling member, a motor for actuating the rotating member, and means acting when the traveling member ceases to move to stop the rotation of the rotating member, comprising a brake element, a stop member operatively connected to the brake element, means including a cam actuated by said motor, for moving the stop member toward and from operative position, and a latch means rendered operative by the movement of the traveling member for limiting the movement of the stop member towards its operative position but rendered inoperative by the movement of the stop member when the movement of the traveling member ceases to enable the brake element to stop the rotation of the rotating member.

51. In an automatic stop mechanism, a rotating record carrying member, a traveling member, of a stop member, a means cooperating with the stop member, and acting when the traveling member stops to render operative the stop member, means automatically operated by the movement of the traveling member to its initial position for rendering the stop means ineffective until the traveling member has moved for a predetermined distance over the face of the record, in combination with independently mounted means actuated by the movements of the traveling member and the stop member for thereafter controlling the action of said stop member.

52. In combination, a rotating member, a traveling member, a brake element, a movable device operatively connected to the brake element, a cam operatively connected to the rotating member for moving said device intermittently in opposite directions, mechanism operatively connected to the traveling member for limiting the movement of said device in the direction of its stop-actuating position, said mechanism being rendered inoperative by the movement of the device in the opposite direction and the stopping of the movement of the traveling member.

53. In a talking-machine having a rotating element and a traveling element, stop mechanism including stopping means, means for permitting movement of the stopping means to its stopping position, and means to restrain such movement during the traverse of the traveling element, and adapted to permit such movement upon the stopping of the traveling element.

54. In a talking-machine having a rotating element and a traveling element, stop mechanism including stopping means, a member having to and fro movement and adapted in one direction of movement to actuate the stopping means, means for permitting movement of the member to stop-actuating position, and means to restrain such movement during traverse of the traveling element, and adapted to permit such movement upon the stopping of the traveling element.

55. In combination, a traveling element, a rotating element, stop mechanism, means including a cam cooperating with the rotating element to actuate the stop mechanism, and means cooperating with the stop mechanism to restrain it from moving to its stopping position while the traveling element is traveling.

56. In combination, a traveling element, a rotating element, stop mechanism, actuating means therefor adapted to have to and fro movement, and means cooperating with the actuating means to limit its movement in stop-actuating direction and acting when the traveling element stops to permit such stop-actuating movement.

57. In combination, a traveling element, a rotating element, stop mechanism for the rotating element, a movable member adapted to have to and fro movement and adapted to actuate the stop mechanism through its movement in one direction, means adapted through the travel of the traveling element to intercept the stop-actuating movement of the movable member, the movable member acting when the traveling element stops to actuate the stop mechanism.

58. In combination, a traveling element, a rotating element, means to stop the rotating element upon the stopping of the traveling element, and means adapted to restrain the operation of the first named means prior to a predetermined initial traverse of the traveling element.

59. In combination, a traveling element, a rotating element, means to stop the rotating element upon the stopping of the traveling element, and means adapted to restrain the operation of the first named means during the movement of the traveling element within the limits of a given area, and to permit such operation upon stopping of the traveling element beyond such given area.

60. In combination, a traveling element, a rotating element, a stop element having to and fro movement during the movement of the rotating element and adapted to move in one direction to effect stoppage of the rotating element, and means for restraining the stop element from moving to stopping position during the travel of the traveling element.

61. In combination, a traveling element, a rotating element, means for effecting stoppage of the rotating element, and having movement to stopping position upon cessation of the travel of the traveling element, and means to restrain such movement during such travel.

62. In combination, a traveling element, a rotating element, means for effecting stoppage of the traveling element, and having movement to stopping position upon cessation of the travel of the traveling element, and latch means operated by the travel of the traveling element for restraining such movement during such travel.

63. In combination, a motor-plate, a motor-frame secured thereto and providing a space therebetween, a motor carried by the motor-frame, a rotatable element driven by the motor, a traveling element cooperating with the rotatable element and carried by the motor-plate, a start and stop mechanism mounted upon the motor-plate in the space between the motor-plate and the motor-frame, and adapted to cooperate with the motor to start and stop it, and including automatic means adapted to stop the motor upon the stopping of the traveling element.

64. In combination with a traveling element and a rotating element, means for manually starting and stopping the rotating element, and stopping means including a cam, actuated by the rotating element.

65. In combination with a traveling element and a rotating element, manually operated stopping means for the rotating element, means for automatically starting the rotating element through movement of the traveling element, and other means for automatically stopping the rotating element through the stopping of the traveling element.

66. In combination with a traveling element and a rotating element, means for automatically starting the rotating element through movement of the traveling element, and other means for automatically stopping the rotating element through the stopping of the traveling element.

67. In combination with a traveling element and a rotating element, means for manually starting and stopping the rotating element, and other means for automatically stopping it through the stopping of the traveling element.

68. In combination, record rotating means, sound reproducing means associated therewith, means for stopping the record rotating means at the completion of the record, and means including a positively acting latch-mechanism for preventing the operation of said stopping means during the initial record playing period.

69. In combination, record rotating means, sound reproducing means associated therewith, means for stopping the record rotating means at the completion of the record, said last-named means including a positively acting latch member.

70. In combination, record rotating means, sound reproducing means associated therewith, means for stopping the record rotating means at the completion of the record, said means including a rotating cam and stopping means actuated thereby, and latch means adapted to prevent actuation of the stopping means and operative during the playing of the record, but inoperative at its termination.

In testimony whereof, we affix our signatures.

GEORGE W. BEADLE.
SAMUEL KOHN.

Certificate of Correction.

It is hereby certified that in Letters Patent No. 1,430,567, granted October 3, 1922, upon the application of George W. Beadle, of Stamford, Connecticut, and Samuel Kohn, of New York, N. Y., for an improvement in "Automatic Stops," an error appears in the printed specification requiring correction as follows: Page 8, line 81, claim 27, for the word " in " read *of;* and that the said Letters Patent should be read with this correction therein that the same may conform to the record of the case in the Patent Office.

Signed and sealed this 5th day of December, A. D., 1922.

[SEAL.]

KARL FENNING,

*Acting Commissioner of Patents.*